United States Patent [19]
Morita et al.

[11] Patent Number: 5,094,898
[45] Date of Patent: *Mar. 10, 1992

[54] MAGNETIC RECORDING MEDIUM COMPRISING A GLASS SUBSTRATE OF CONTROLLED SURFACE ROUGHNESS AND A MAGNETIC THIN FILM LAYER OF GAMMA FE$_2$O$_3$

[75] Inventors: Haruyuki Morita; Yasufumi Uno; Joichiro Ezaki, all of Nagano, Japan

[73] Assignee: TDK Corporation, Tokyo, Japan

[*] Notice: The portion of the term of this patent subsequent to Mar. 10, 2009 has been disclaimed.

[21] Appl. No.: 541,524

[22] Filed: Jun. 21, 1990

[30] Foreign Application Priority Data

Jun. 29, 1989 [JP] Japan .................................. 1-167990

[51] Int. Cl.$^5$ .............................................. G11B 23/00
[52] U.S. Cl. ...................................... 428/64; 428/336; 428/409; 428/432; 428/694; 428/695; 428/900; 428/65; 427/128; 204/192.2
[58] Field of Search ............... 428/694, 900, 695, 432, 428/64, 336, 409; 427/128; 204/192.2

[56] References Cited

U.S. PATENT DOCUMENTS

| | | | |
|---|---|---|---|
| 3,996,095 | 12/1976 | Ahn et al. | 156/610 |
| 4,188,434 | 2/1980 | Loran | 428/65 |
| 4,704,199 | 11/1987 | Yokokawa et al. | 204/298 |
| 4,920,014 | 4/1990 | Hirai et al. | 428/698 |

Primary Examiner—Merrell C. Cashion, Jr.
Assistant Examiner—Stevan A. Resan
Attorney, Agent, or Firm—Oblon, Spivak, McClelland, Maier & Neustadt

[57] ABSTRACT

A magnetic recording disk comprising a rigid substrate and a magnetic layer of the continuous thin film type predominantly composed of γ-Fe$_2$O$_3$ shows high durability, especially CSS durability when the magnetic layer has specific peak area ratios in an X-ray diffraction chart thereof, the surface roughness of the substrate and medium surface is controlled to desired ranges, and a lubricating film of a perfluoro derivative of poly(n-propylene oxide) with a specific molecular weight is used. Reliable recording/reproduction can be conducted on the magnetic recording disk using a flying magnetic head.

15 Claims, 7 Drawing Sheets

FIG. 13

MAGNETIC RECORDING MEDIUM COMPRISING A GLASS SUBSTRATE OF CONTROLLED SURFACE ROUGHNESS AND A MAGNETIC THIN FILM LAYER OF GAMMA FE$_2$O$_3$

CROSS-REFERENCE TO RELATED APPLICATIONS

Reference is made to copending U.S. Ser. No. 354,375 filed May 19, 1989 for "Magnetic Recording Medium, Method for Making, and Magnetic Recording/Reproducing System Using the Same", copending U.S. Ser. No. 514,964 filed Apr. 26, 1990, for "Magnetic Recording Medium and Magnetic Recording/Reproducing Method", and copending U.S. Ser. No. 514,401 filed Apr. 26, 1990, for "Magnetic Recording Medium and Magnetic Recording/Reproducing Method", all assigned to the same assignee as the present invention.

FIELD OF THE INVENTION

This invention relates to a magnetic recording medium of the hard type having a magnetic layer on a rigid substrate, more particularly, such a magnetic recording medium of the hard type having a magnetic layer of the continuous thin film type based on $\gamma$-Fe$_2$O$_3$, and a system for recording and reproducing information in such a magnetic recording medium using a flying magnetic head.

BACKGROUND OF THE INVENTION

Magnetic disk drive equipment for computers or the like are adapted to drive a magnetic disk of the hard type having a magnetic layer on a rigid substrate relative to a flying magnetic head.

Heretofore, magnetic disks of the coating type have been used in such magnetic disk drives. To meet a demand for increasing the capacity of magnetic disks, magnetic disks of the thin film type having a magnetic thin film, also known as a continuous thin film, which is formed by vapor phase deposition techniques such as sputtering now find increasing use because they have excellent magnetic properties and increased recording density.

The thin film type magnetic disks most often use modified substrates including aluminum alloy substrates having an Ni-P undercoat layer plated thereon or a hard oxide layer formed by anodization. A Cr under layer, a metallic magnetic layer such as a Co-Ni layer, and a protective lubricant layer of carbon or the like are consecutively deposited on the substrate by sputtering.

However, a reliability problem arises because the metallic magnetic layer such as Co-Ni is liable to corrosion and less hard. On the contrary, Japanese Patent Application Kokai Nos. 43819/1987 and 175219/1988 disclose a magnetic thin film based on iron oxide which is chemically stable, resistant against corrosion, and hard enough.

The flying magnetic head has a slider for generating flying forces. The flying magnetic head is generally classified into the composite type in which a core is integrated with the slider and the monolithic type in which a core also serves as the slider.

In addition, great attention is paid to flying thin film magnetic heads for potential maximum density recording. The flying thin film magnetic heads have magnetic pole, gap, coil and other necessary layers formed on a base by vapor phase deposition and other techniques. In these flying thin film heads, the base plays the role of a slider.

A magnetic disk equipment drives a magnetic disk relative to a flying magnetic head in a contact start and stop (CSS) manner so that an impact is applied to the magnetic layer of the disk upon start-up and shut-down because the floating surface of the magnetic head (or the surface of the slider facing the magnetic disk) rests on the magnetic disk before and after the operation.

This tendency is aggravated particularly when a flying thin film magnetic head is used. The magnetic layer undergoes more impact upon CSS because the spacing or flying height between the magnetic disk and the magnetic head is minimized for high density recording.

A magnetic disk having an iron oxide base magnetic thin film as disclosed in Japanese Patent Application Kokai Nos. 43819/1987 and 175219/1988 uses a glass substrate having a mirror finished surface so that the magnetic layer has a surface roughness (Rmax) as low as up to 100 Å.

The magnetic disk of this type allows the flying height to be set minimal although the magnetic layer would be more severely damaged if undesired accidental contact occurred between the disk and the head upon CSS or during operation.

Japanese Patent Application Kokai Nos. 43819/1987 and 175219/1988, however, do not refer to the durability of the magnetic layer. No effective proposal for increasing the durability of an iron oxide base magnetic layer of the continuous thin film type is available.

Under these circumstances, the inventors have proposed in U.S. Ser. No. 514,401 filed Apr. 26, 1990 that a magnetic layer predominantly composed of $\gamma$Fe$_2$O$_3$ becomes more durable when the layer has controlled peak area ratios in an X-ray diffraction chart thereof or when $\alpha$-Fe$_2$O$_3$ is contained in the layer.

In magnetic disks having a magnetic thin film predominantly composed of iron oxide, the magnetic layer has minimal surface roughness as previously described. Unless an appropriate protective layer is chosen, the friction between a magnetic disk and a magnetic head is increased so that the magnetic head would stickily slip or cling to the disk during CSS or the like.

SUMMARY OF THE INVENTION

Therefore, a primary object of the present invention is to provide a magnetic recording and reproducing method using a magnetic recording medium having a magnetic layer of the continuous thin film type predominantly comprising $\gamma$-Fe$_2$O$_3$ on a rigid substrate and a flying magnetic head, in which the friction between the magnetic recording medium and the magnetic head during CSS durations is reduced and less varying, little clinging of the magnetic head to the magnetic recording medium occurs, and little damage or flaw is induced to the magnetic head and the magnetic recording medium and to provide a magnetic recording medium with which such recording and reproduction can be implemented.

The present invention provides a magnetic recording medium comprising a rigid substrate having a pair of opposed major surfaces and a magnetic layer of the continuous thin film type on at least one major surface predominantly comprising $\gamma$-Fe$_2$O$_3$. According to the present invention, the magnetic layer meets the following conditions:

$0 \leq P(400)/P(311) \leq 1.0$ and $0 \leq P(222)/P(311) \leq 0.5$ wherein P(400), P(222) and P(311) are peak areas at indexes of plane (400), (222) and (311) of $\gamma$-Fe$_2$O$_3$, respectively, in an X-ray diffraction chart of the magnetic layer.

The rigid substrate has a surface roughness Rmax in the range of from 10 to 100 Å on the one major surface. The medium has a surface roughness Rmax in the range of from 50 to 200 Å on an outer surface adjacent to the magnetic layer.

The medium further comprises on the magnetic layer a lubricating film containing a compound of the following formula:

$$F(CF_2CF_2CF_2O)_nCF_2CF_3$$

wherein n is a positive integer, with an average molecular weight of 1,000 to 10,000.

Preferably, the lubricating film has a thickness of 4 to 100 Å.

Preferably, the lubricating film further contains a compound having a melting point of up to 50° C.

Preferably, the compound having a melting point of up to 50° C. is at least one member selected from the group consisting of fatty acids and salts thereof, alcohols, esters, and fluorinated compounds.

Preferably, the magnetic layer contains $\alpha$-Fe$_2$O$_3$.

Preferably, in the magnetic layer, the content of $\alpha$-Fe$_2$O$_3$ is higher on a side remote from the substrate than on a side adjacent to the substrate.

Preferably, the magnetic layer meets the following condition:

$0.02 \leq P(104)/P(311) \leq 0.20$ wherein P(104) is a peak area at an index of plane (104) of $\alpha$-Fe$_2$O$_3$ in an X-ray diffraction chart of the magnetic layer.

Preferably, the substrate is formed of glass.

The present invention also provides a method for recording and reproducing information in a magnetic recording medium of disk shape as defined above, comprising the step of rotating the magnetic recording medium in close proximity to a flying magnetic head. The flying magnetic head is kept at a spacing of up to 0.2 μm from the rotating magnetic disk.

Preferably, the flying magnetic head is kept at a spacing of up to 0.1 μm.

In the magnetic recording/reproducing method of the invention, the magnetic recording medium and/or the magnetic head has a lubricating film containing the above defined compound.

This ensures good CSS properties and causes little damage or flaw to the magnetic recording medium and magnetic head.

More particularly, a lubricating film of a compound of the above-defined formula, that is, a perfluoro derivative of poly(n-propylene oxide) provides a lower coefficient of friction between the medium and the head and a minimal variation in coefficient of friction after heavy duty drive and is thus durable as compared with lubricating films of perfluoro derivatives of other polyalkylene oxides.

Inclusion of a compound having a boiling point of up to 50° C. provides a lower initial coefficient of friction.

Figure 2:
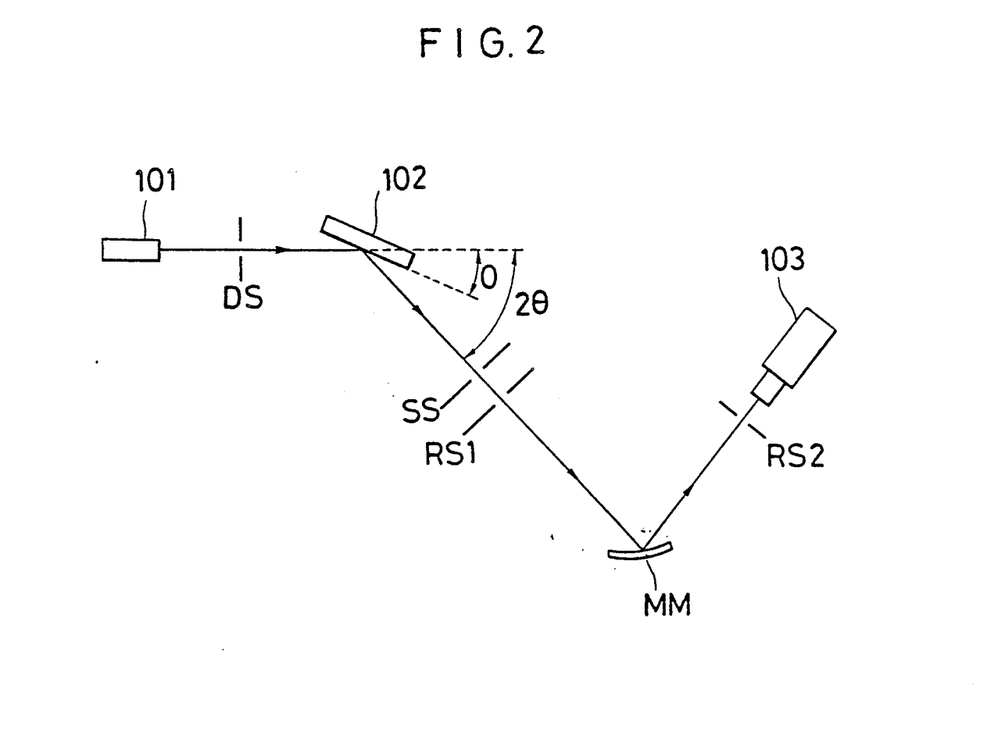
FIG. 2 diagrammatically illustrates the arrangement of an X-ray diffractometer.

High durability is imparted to the magnetic layer when the area ratios of selected peaks of $\alpha$-Fe$_2$O$_3$ and $\gamma$-Fe$_2$O$_3$ in an X-ray diffraction chart as measured by an X-ray diffractometer of an optical arrangement as shown in FIG. 2 are within the above-defined ranges.

Higher durability is obtained when the magnetic layer predominantly comprising $\gamma$-Fe$_2$O$_3$ contains $\alpha$-Fe$_2$O$_3$.

Durability is further enhanced when the area ratios of selected peaks of $\gamma$-Fe$_2$O$_3$ are within the above defined ranges and the surface roughness of the substrate and the medium on the magnetic layer side are within the above-defined ranges.

High durability leads to excellent CSS durability, especially improved CSS durability at low and high temperatures. The magnetic layer experiences a minimal deterioration or damage upon accidental contact with a magnetic head.

The inclusion of $\alpha$-Fe$_2$O$_3$ in the $\gamma$-Fe$_2$O$_3$ based magnetic layer was believed undesirable in the prior art because of a lowering of magnetic properties and recording/reproducing output.

However, for most magnetic recording media such as magnetic disks for use in computers, it is most important to ensure durability to improve reliability even despite a slight loss of reproduction output. Nevertheless, the invention achieves improved durability without a substantial lowering of magnetic properties due to the presence of $\alpha$-Fe$_2$O$_3$.

Densi Tusin Gakkai Ronbun-Si (Journal of the Japanese Electronic Communications Society), '80/9, Vol. J63-C, No. 9, pages 609–616 describes a magnetic disk having a $\gamma$-Fe$_2$O$_3$ thin film formed by reactive sputtering.

According to this article, the thin film is prepared by first depositing an Fe$_3$O$_4$ thin film by the direct method, that is, by sputtering an iron target in an oxidizing atmosphere. FIG. 8 on page 613 of the article shows X-ray diffraction patterns of the sputtered Fe$_3$O$_4$ thin film.

When the ratios of peak heights are determined for a thin film identified as (c) in FIG. 8, it is found that (400)/(311) and (222)/(311) fall within the ranges of peak area ratios defined by the present invention.

However, the X-ray diffraction pattern of this article does not show peak areas as defined in the present invention, and the article refers to only the Fe$_3$O$_4$ thin film, but nowhere to P(400)/P(311) and P(222)/P(311) of $\gamma$-Fe$_2$O$_3$ thin films.

No reference is made to the surface roughness (Rmax) of the substrate and the magnetic layer as defined in the present invention since the substrate on which the thin film is formed in the above-cited article is an anodized Al alloy substrate.

Further, the above-cited article pays no attention to the durability of magnetic disks and describes nowhere that the magnetic disk medium has a lubricating film as used in the present invention.

In turn, Japanese Patent Application Kokai Nos. 43819/1987 and 175219/1988 describe that the floating stability of a magnetic head is improved when the magnetic layer has a surface roughness (Rmax) within a predetermined range. No reference is made to X-ray diffraction or durability. The present invention intends to impart high durability to such a magnetic layer having similar Rmax.

DETAILED DESCRIPTION OF THE INVENTION

The construction of the present invention will be described in detail.

Figure 1:
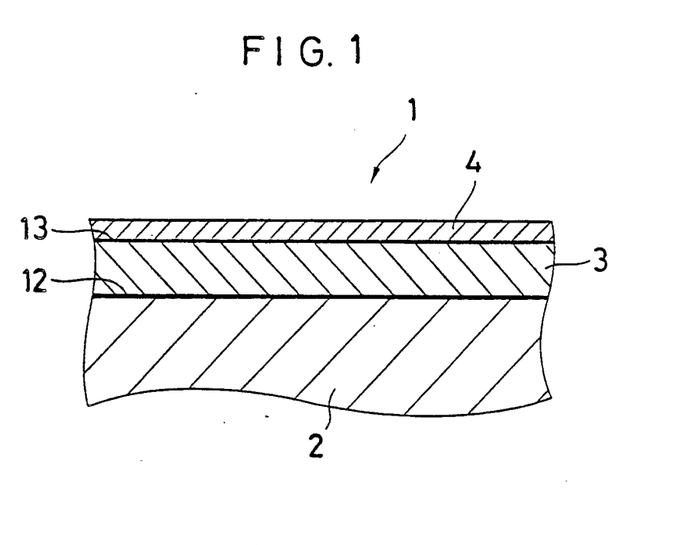
FIG. 1 is a cross section of a portion of a magnetic recording medium according to the present invention.

Referring to FIG. 1, there is illustrated at 1 a magnetic recording medium according to the present invention as comprising a rigid substrate 2, a magnetic layer 3 in the form of a continuous thin film thereon, and a lubricating film 4 on the magnetic layer.

The substrate used herein is most often formed of glass for the reasons that its preparation is simplified partly because a need for an undercoat layer is eliminated, that it can be readily polished to a controlled surface roughness, and that it withstands heat applied during magnetic layer formation and heat treatments for surface roughness control.

The glass used herein is preferably tempered glass, more preferably glass surface tempered by chemical strengthening.

In general, glass is chemically tempered by replacing alkali ions in proximity of the glass surface by alkali ions of another species from the exterior at a temperature lower than the transition temperature whereby compression stresses are induced at the glass surface by the difference in the spatial volume occupied by the ions.

Ion substitution is carried out by dipping the glass in a molten alkali salt. The salt used herein may be a nitrate, sulfate or similar salt. The molten salt is at a temperature of about 350° to about 650° C. and the dipping time ranges from about 1 to about 24 hours.

More illustratively, glass may be strengthened by using $KNO_3$ as the molten alkali salt to thereby substitute K ions for Na ions in the glass or by using $NaNO_3$ to substitute Na ions for Li ions in the glass. It is also possible to simultaneously replace Na and Li ions in glass.

Since the thus strengthened or compression stressed layer is present only in proximity to the glass substrate surface, there results a surface tempered glass. The compression stressed layer is preferably 10 to 200 μm, more preferably 50 to 150 μm thick.

It is to be noted that surface strengthening may be applied to all or a part of the surface of a glass substrate.

The glass substrate preferably has a contact angle with water of up to 20 degrees, more preferably up to 10 degrees on the major surface adjacent to the magnetic layer.

A choice of contact angle with water to this range will improve the bond of the substrate to the iron oxide based magnetic layer of the continuous thin film type.

No lower limit is imposed on the contact angle of the substrate surface although it is usually at least 2 degrees.

The contact angle with water of the glass substrate may be determined, for example, by applying a drop of pure water on the glass surface and measuring the contact angle after 30 seconds in an atmosphere at 18°–23° C. and RH 40–60%.

In order that the glass substrate have such a contact angle, the glass substrate may be processed as follows.

The glass substrate on the surface is first polished, tempered as previously described, and then polished again preferably to a surface roughness as defined later.

The polished glass substrate is washed with pure water, and then cleaned with the sequence of steps of detergent washing→pure water rinsing→organic solvent vapor drying.

In the detergent washing step, the type of detergent is not critical. Although any detergents for general washing purposes may be used, alkaline detergents, especially weakly alkaline detergents capable of slightly etching the glass surface, for example, Extran MA01 (Merck Co.) are preferably employed.

The detergent washing step is preferably carried out by immersing the glass substrate in a detergent solution at room temperature or heated at a temperature of up to about 80° C. The substrate may be kept immersed for about 1 to about 24 hours although the substrate is preferably subject to ultrasonic cleaning for about 5 to about 60 minutes.

At the end of detergent washing, the glass substrate is washed with pure water preferably by ultrasonic cleaning.

The ultrasonic cleaning used herein may be of a multiple frequency type wherein ultrasonic vibrations are induced at multiple frequencies in a certain range of 10 to 100 kHz or a fixed frequency type wherein vibrations are induced at a fixed frequency of 26 kHz or 45 kHz, for example. In either case, smaller debris can be cleaned to a larger extent with higher frequencies.

Figure 5:
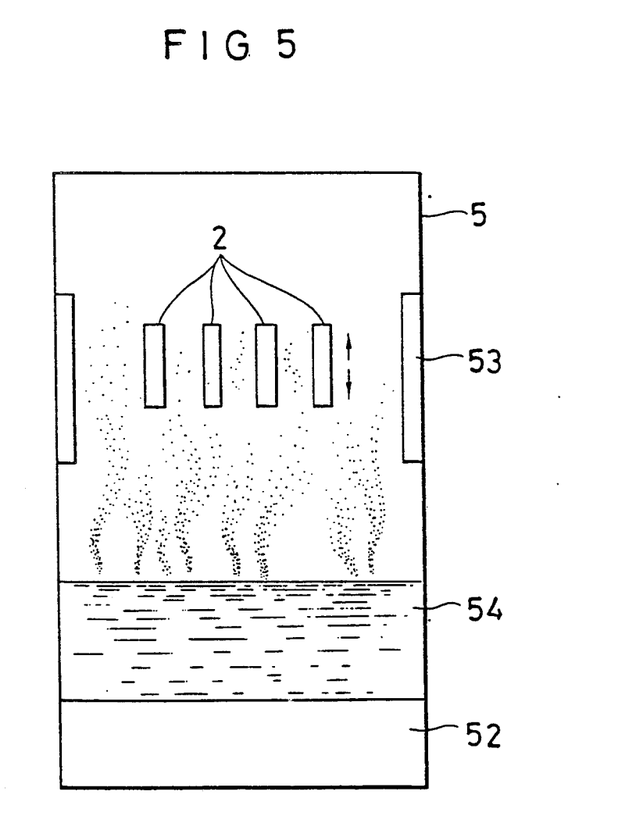
FIG. 5 is a schematic illustration of a vapor drying apparatus for glass substrates.
Figure 6:
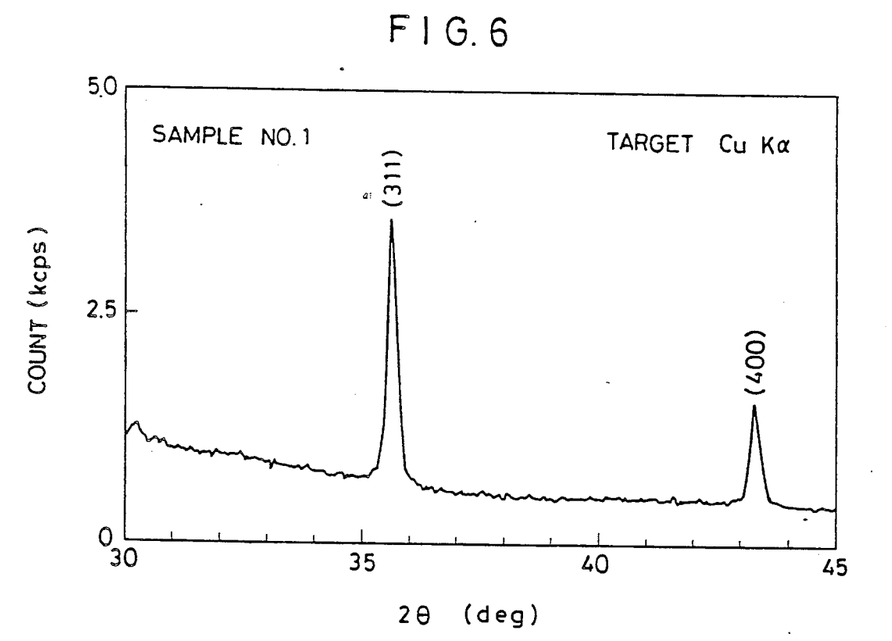
FIGS. 6, 7, 8, and 9 are X-ray diffraction charts of $\gamma\text{-}Fe_2O_3$ magnetic layers.
Figure 7:
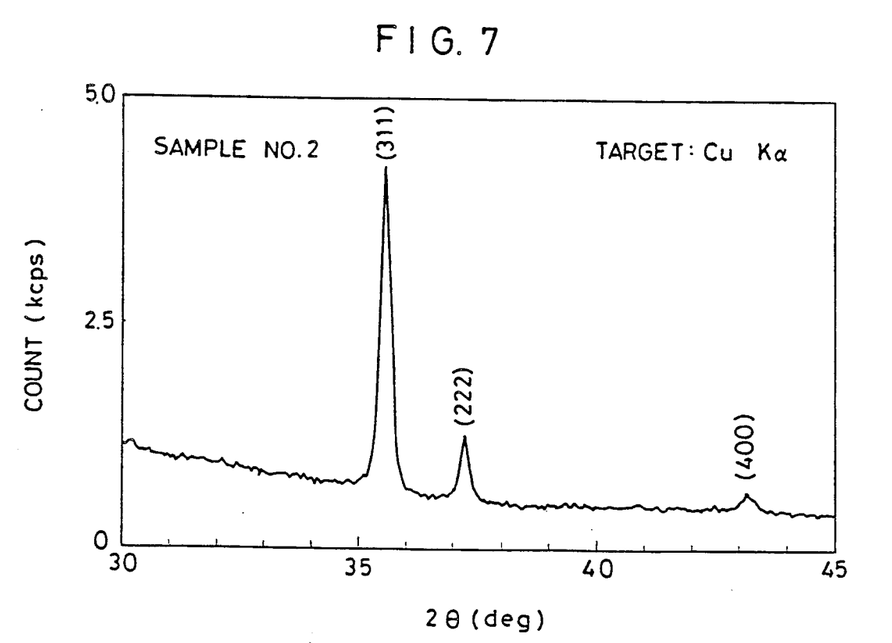
Figure 8:
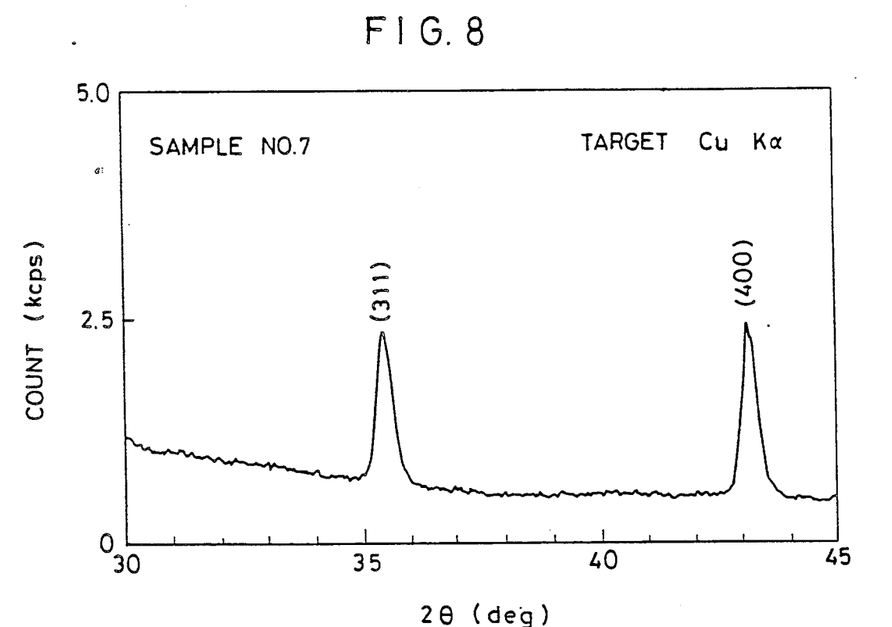
Figure 9:
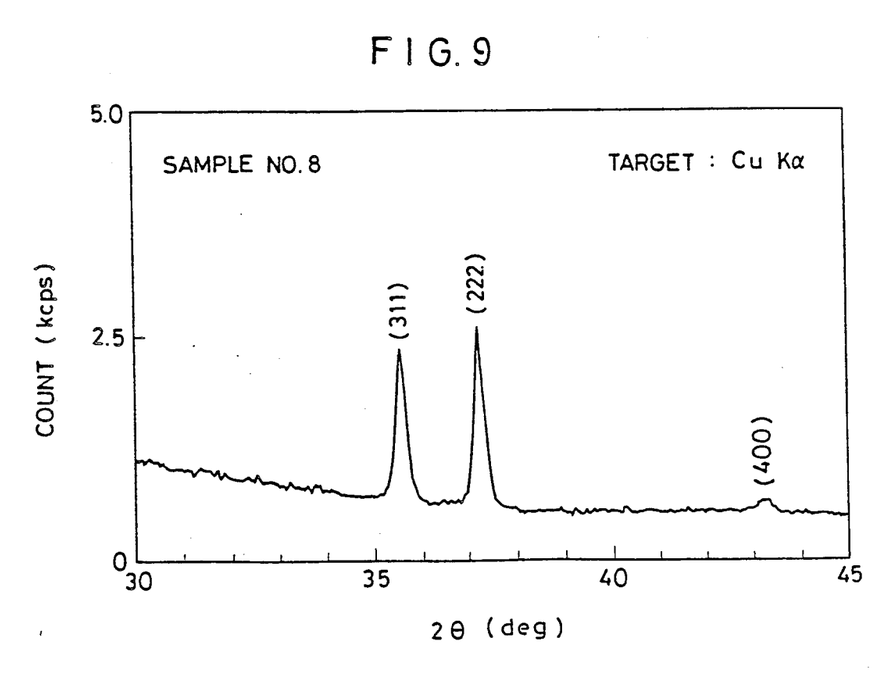

Vapor drying with an organic solvent is carried out, preferably using an apparatus as shown in FIG. 5.

The vapor drying apparatus 11 shown in FIG. 5 includes a tank 111, a heater 112, and a cooler 113.

The tank 111 contains an organic solvent 114. An array of glass substrates 2 is held for vertical motion above the surface of the organic solvent 114.

The heater 112 heats the organic solvent 114 to evaporate into vapor. The cooler 113 causes the organic solvent vapor to cool and condense on the substrates 2. Liquid drops of organic solvent condensed on the substrates 2 then drop down from the substrates 2 toward the organic solvent bath 114.

The glass substrates are kept in the vapor drying tank 111 for about 5 to 60 minutes, completing the final washing of the glass substrates.

Then, the glass substrates 2 are gradually pulled upward where the evaporating amount of organic solvent exceeds the condensing amount of organic solvent, completing drying.

A very clean surface is obtained without a drying spot since this type of vapor drying is characterized by a slow rate of drying.

The organic solvent used in the vapor drying is not critical although it is preferably selected from acetone, isopropyl alcohol (IPA), methanol, ethanol, and Fron, with the IPA being most preferred.

Besides the vapor drying, the final drying may be carried out by any other desired processes, for example, centrifugal spin-off drying combined with dry nitrogen blow. In this case, the pure water rinsing step is preferably followed by cleaning with an organic solvent which may be selected from those described for the vapor drying.

Brush scrubbing may be additionally combined with the above-mentioned steps if desired.

The rigid substrate preferably has a surface roughness (Rmax) in the range of from 10 to 100 Å, more preferably from 40 to 80 Å, most preferably from 40 to 60 Å. This range of Rmax of the rigid substrate is not only effective in improving the durability of the associated magnetic recording medium, but also allows the medium to have a specific Rmax at a surface adjacent to the magnetic layer as will be described later.

It is to be noted that the Rmax is measured according to JIS B 0601.

The surface roughness may be controlled to the above specified range, for example, by mechanochemical polishing as disclosed in Japanese Patent Application Kokai Nos. 43819/1987 and 175219/1988.

The material of the glass substrate is not critical to the present invention. A choice may be made from borosilicate glass, aluminosilicate glass, quartz glass, titanosilicate glass, and the like, with the aluminosilicate glass being preferred for mechanical strength.

Crystal free glass is preferably used when the glass substrate is surface smoothed by mechanochemical polishing.

Otherwise the desired Rmax range is not achievable since grain boundaries are polished relatively faster by mechanochemical polishing.

The shape and dimensions of the glass substrate are not particularly limited although it is generally of a disk shape having a thickness of about 0.5 mm to about 5 mm and a diameter of about 25 mm to about 300 mm.

On the rigid substrate is formed a magnetic layer of the continuous thin film type based on $\gamma Fe_2O_3$.

In an X-ray diffraction analysis of the magnetic layer, the following conditions:

$$0 \leq P(400)/P(311) \leq 1.0 \text{ and}$$

$$0 \leq P(222)/P(311) \leq 0.5,$$

preferably $$0 \leq P(400)/P(311) \leq 0.6 \text{ and}$$

$$0 \leq P(222)/P(311) \leq 0.3,$$

are met, provided that P(400), P(222) and P(311) are peak areas at indexes of plane (400), (222) and (311) of $\gamma$-$Fe_2O_3$, respectively, in the X-ray diffraction chart.

Another essential requirement is that the magnetic recording medium has a surface roughness Rmax of 50 to 200 Å, preferably 80 to 150 Å, more preferably 80 to 120 Å, most preferably 90 to 120 Å on the magnetic layer side.

Durability, especially CSS durability is improved by controlling the peak area ratios and Rmax to the above-defined ranges.

More illustratively, an increase of P(222) implies an increase in the proportion of planes (222) and (111) that extend parallel to the magnetic layer surface. Gamma-$Fe_2O_3$ has a spinel structure in which plane (111) is most liable to slip motion.

If plane (222) which extends parallel to plane (111) has an increased peak area, that is, if P(222)/P(311) has an increased value, the $\gamma$-$Fe_2O_3$ of which the magnetic layer is formed tends to undergo slip or dislocation upon sliding contact with the magnetic head, resulting in low durability. Durability is critically lowered when the value of P(222)/P(311) exceeds 0.5.

Since plane (100) which extends parallel to plane (400) is likely to slip motion next to plane (111), durability is critically lowered if the value of P(400)/P(311) exceeds 1.

By controlling the magnetic layer side surface to an Rmax within the above defined range, not only durability is enhanced, but also high density recording is permissible because recording and reproduction can be conducted with the spacing between the magnetic layer surface and the floating surface of the flying magnetic head kept at 0.1 $\mu$m or less without clinging of the flying magnetic head to the magnetic recording medium.

In one preferred embodiment of the invention, the magnetic layer further contains $\alpha$-$Fe_2O_3$ because durability is further improved.

Preferably, the magnetic layer containing $\alpha$-$Fe_2O_3$ meets the following condition:

$$0.02 \leq P(104)/P(311) \leq 0.20,$$

more preferably $$0.05 \leq P(104)/P(311) \leq 0.15,$$

provided that P(104) is a peak area at an index of plane (104) of $\alpha$-$Fe_2O_3$ in an X-ray diffraction chart of the magnetic layer.

A magnetic layer having such a specific peak area ratio is more durable.

More illustratively, only a relatively low durability improvement is achieved with a P(104)/P(311) value below the range whereas the recording/reproducing output is reduced with a P(104)/P(311) value beyond the range.

Preferably, an X-ray diffraction chart is drawn by the following procedure.

FIG. 2 shows one typical arrangement of an X-ray diffractometer.

In FIG. 2, an X-ray source 101 emits an X-ray toward the magnetic layer of a magnetic recording medium 102 through a divergent slit DS, where the ray is diffracted. The diffracted X-ray is passed through a scattering slit SS and a receiving slit RS, reflected by a monochromator MM into monochromatic X-ray, and directed to a counter 103 through a receiving slit RS where the intensity of the X-ray is counted and typically recorded by means of a rate meter or the like.

During measurement, the magnetic recording medium 102 is rotated at a scanning rate of $d\theta/dt$ and the scattering slit SS and the light path defining components downstream of the slit are rotated at a scanning rate of $2d\theta/dt$.

For each of the peaks in the resulting X-ray diffraction chart, the peak area with the background removed is determined by integration, from which the area ratios are calculated.

When measured with the optical arrangement of FIG. 2 which uses CuKα as the X-ray source, the peak of index of plane (104) of α-$Fe_2O_3$ appears at approximately 33.3°, and the peaks of indexes of plane (400), (222), and (311) of γ-$Fe_2O_3$ appear at approximately 43.5°, 37.3° and 35.6°, respectively.

In the magnetic layer containing α-$Fe_2O_3$, α-$Fe_2O_3$ may be evenly distributed although the content of α-$Fe_2O_3$ is preferably higher at the surface, that is, on a side remote from the substrate.

The presence of a higher proportion of α-$Fe_2O_3$ on the surface reinforces the surface of the magnetic layer which is liable to damages upon sliding contact with the magnetic head. This preferential distribution achieves high durability at the surface while reducing the overall content of α-$Fe_2O_3$ throughout the magnetic layer.

The content of α-$Fe_2O_3$ may be gradually increased toward the magnetic layer surface. An alternative distribution is that α-$Fe_2O_3$ is present only at the surface and absent at the substrate adjoining side.

The content of α-$Fe_2O_3$ near the magnetic layer surface may be analyzed by the following procedure, for example.

Figure 3:
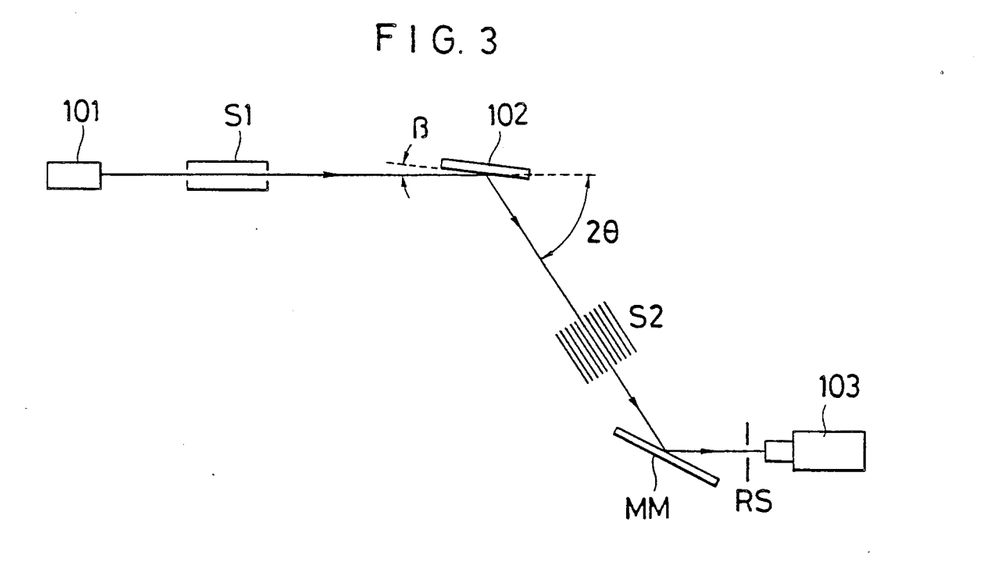
FIG. 3 diagrammatically illustrates the arrangement of a low incident angle X-ray diffractometer.

FIG. 3 shows a typical arrangement of a low incident angle X-ray diffractometer.

In FIG. 3, an X-ray source 101 emits an X-ray toward a magnetic recording medium 102 through a solar slit S1. The X-ray is incident on the magnetic layer of the magnetic recording medium 102 at an angle β with respect to the magnetic layer surface where the ray is diffracted.

The diffracted X-ray is passed through a solar slit S2, reflected by a monochromator MM into monochromatic X-ray, and directed through a receiving slit RS to a counter 103 where the intensity of X-ray is counted.

Unlike the arrangement of FIG. 2, the low incident angle X-ray diffractometer is designed such that the magnetic recording medium 102 is fixed relative to the incident X-ray while the solar slit S2 and the light path defining components downstream thereof are rotated at a scanning rate of $2d\theta/dt$.

The distribution of α$Fe_2O_3$ can be determined by changing the angle β between the incident X-ray and the magnetic layer surface. More particularly, portions near the surface can be analyzed by reducing angle β. The magnetic layer can be analyzed to a deeper section as angle β is increased.

In the low incident angle X-ray diffraction analysis, the present invention favors that P(104)/P(311) increases as angle β is reduced. For example, the value of P(104)/P(311) measured at an angle β of 0.5° is preferably 1.5 to 10 times, more preferably 1.5 to 5 times the value of P(104)/P(311) measured at an angle β of 2.0°.

Magnetic layers of the continuous thin film type predominantly comprising γ-$Fe_2O_3$ are preferably prepared by first forming $Fe_3O_4$ and then oxidizing it into γ-$Fe_2O_3$.

Formation of $Fe_3O_4$ may be either by a direct process or by an indirect process although the direct process is preferred because of ease of a proper choice of peak area ratios and simplicity.

The direct process is to directly form $Fe_3O_4$ on a substrate by a reactive sputtering technique. The direct process may be classified into three types, an oxidative sputtering in an oxidizing atmosphere using a target of Fe, a reductive sputtering in a reducing atmosphere using a target of α$Fe_2O_3$, and a neutral sputtering in a neutral atmosphere using a target of $Fe_3O_4$. The oxidative sputtering is preferred for the present invention because of ease of sputtering control and a high rate of film formation.

The oxidative sputtering method carries out sputtering in an Ar gas atmosphere having oxygen ($O_2$) gas added as a reactant gas.

In order that γ-$Fe_2O_3$ exhibit the above-defined peak area ratios in an X-ray diffraction diagram, the partial pressure $P_{O2}$ of oxygen gas and the total pressure $P_{(Ar+O2)}$ of argon and oxygen gases are preferably controlled to meet the equation:

$$0.043 \leq P_{O2}/P_{(Ar+O2)} \leq 0.073,$$

more preferably $$0.048 \leq P_{O2}/P_{(Ar+O2)} \leq 0.069.$$

In sputtering, oxygen is preferably introduced into a vacuum chamber by blowing oxygen gas against the substrate.

The total pressure P(Ar+02) is preferably controlled to the range of from $1 \times 10^{-4}$ to $1 \times 10^{-2}$ Torr, more preferably from $5 \times 10^{-4}$ to $8 \times 10^{-3}$ Torr.

The preferred sputtering method is RF sputtering.

The sputtering power is not critical, but is preferably in the range of 0.2 to 2 kW, more preferably 0.4 to 1.5 kW.

The detail of the formation of $Fe_3O_4$ thin film by the direct process is described in Densi Tusin Gakkai Ronbun-Si (the Journal of Japanese Electronic Communications Society), '80/9, Vol. J63-C, No. 9, pages 609–616. It is recommended to form a magnetic layer in accordance with the teaching of this article while sputtering is effected with the controlled oxygen partial pressure.

The indirect process is by sputtering an Fe target in an oxidizing atmosphere to form α-$Fe_2O_3$ and reducing it into $Fe_3O_4$.

The $Fe_3O_4$ film formed by sputtering is finally oxidized into γ-$Fe_2O_3$.

Oxidation is preferably carried out by a heat treatment in an atmosphere having an oxygen partial pressure of about 0.05 to 0.8 atm. and a total pressure of about 0.5 to 2 atm., typically in the ambient air.

The heat treatment may be at a holding temperature of about 200° to 400° C., especially about 250° to 350° C. for about 10 minutes to about 10 hours, especially about 1 to 5 hours.

In the heat treatment, the temperature is preferably increased to the holding temperature at a rate of 3.5 to 20° C./min., especially 5.0° to 12° C./min. in order that the above defined peak area ratio associated with α-$Fe_2O_3$ be readily obtained.

The heating rate may be constant, or gradually increased or decreased. A schedule of different heating rates may be used until the holding temperature is reached.

The magnetic recording medium on the magnetic layer side can have Rmax within the above defined range by controlling the temperature and time of the heat treatment.

The thus formed magnetic layer generally has magnetic properties, including a coercive force of from about 400 to 2,500 Oe, a remanence or residual magnetization of from about 2,000 to 3,000 G, and a squareness ratio of from about 0.55 to 0.85. These magnetic properties are little affected by inclusion of α-Fe$_2$O$_3$.

The magnetic layer may contain an additional element such as Co, Ti, and Cu if desired as well as argon or other elements from the film forming atmosphere.

Inclusion of cobalt is effective for controlled coercive force. Cobalt is preferably present in an amount to substitute for up to 10% by weight of Fe. An iron target containing Co may be used in sputtering when it is desired that the magnetic layer contain Co.

The magnetic layer is preferably about 500 to about 3,000 Å thick for productivity and magnetic properties.

On the magnetic layer is formed a lubricating film containing a compound of the following formula:

$$F(CF_2CF_2CF_2O)_nCF_2CF_3$$

wherein n is a positive integer, with an average molecular weight of 1,000 to 10,000.

The provision of a lubricating film minimizes friction variations between the magnetic recording medium and the magnetic head during durability operation and maintains satisfactory lubrication. The lubricating film containing such a compound is water repellent so that no clinging occurs between the magnetic recording medium and the magnetic head under highly humid conditions and a variation of lubricity with time is reduced.

The compounds of the above formula preferably have an average molecular weight of 1,000 to 5,000, more preferably 2,000 to 4,000.

Dynamic viscosity ranges preferably from 20 to 600 cSt, more preferably from 10 to 200 cSt, most preferably from 10 to 50 cSt at 20° C.

Pour point ranges preferably from −90° C. to −50° C., more preferably from −80° C. to −60° C., most preferably from −80° C. to −70° C.

These compounds can be synthesized by a well-known method involving the steps of subjecting an oxetane which is an addition product of tetrafluoroethane and formaldehyde to ring-opening polymerization followed by fluorination. Otherwise, Demnum S-20 and S-65 marketed from Daikin Industry K.K. may be used.

The compounds of the above formula are complete perfluoro derivatives of poly(n-propylene oxide) having no substituent at their end. The benefits of the invention are not obtained with analogous compounds, but having a perfluoroalkylene backbone of a different structure or having a substituent at their end.

In the practice of the invention, the lubricating film preferably contains a compound having a melting point of up to 50° C. in addition to a compound of the above-defined formula.

The compound having a melting point of up to 50° C. is at least one member selected from the group consisting of fatty acids and salts thereof, aliphatic alcohols and esters thereof, fluorinated derivatives thereof, and other fluorinated compounds. They may be either saturated or unsaturated.

A preferred choice is made among the following compounds.

Fatty acids

CH$_3$(CH$_2$)$_7$CH=CH(CH$_2$)$_7$COOH $$\begin{array}{l} \text{OH} \\ | \\ \text{H—C—CH}_2\text{—CH(CH}_2)_5\text{—CH}_3 \\ \| \\ \text{H—C—(CH}_2)_7\text{—COOH} \end{array}$$

CH$_3$(CH$_2$CH=CH)$_3$CH$_2$(CH$_2$)$_6$COOH $$\begin{array}{l} C_8H_{17} \\ \quad\diagdown \\ \qquad \text{CHCH}_2\text{COOH} \\ \quad\diagup \\ C_7H_{15} \end{array}$$

CH$_3$CHCH$_2$(CH$_2$)$_{12}$CH$_2$COOH
|
CH$_3$

CH$_3$CH$_2$CH(CH$_2$)$_{12}$CH$_2$COOH
|
CH$_3$

CH$_2$(CH$_2$)$_{11}$COOH
CH$_3$(CH$_2$)$_9$COOH
elaidic acid

CH$_3$(CH$_2$)$_{10}$COOH
CH$_3$(CH$_2$)$_8$COOH
erucic acid, etc.

Alcohols

CH$_3$(CH$_2$)$_9$OH
CH$_3$(CH$_2$)$_{11}$OH
CH$_3$(CH$_2$)$_{13}$OH
CH$_3$(CH$_2$)$_{15}$OH
CH$_3$(CH$_2$)$_{13}$CH(CH$_3$)OH
CH$_3$(CH$_2$)$_{15}$CH(CH$_3$)OH
C$_{18}$H$_{35}$OH (oleyl alcohol)
C$_{18}$H$_{31}$OH, etc.

CH$_3$(CH$_2$)$_{10}$OH
CH$_3$(CH$_2$)$_{12}$OH
CH$_3$(CH$_2$)$_{14}$OH
CH$_3$(CH$_2$)$_{12}$CH(CH$_3$)OH
CH$_3$(CH$_2$)$_{14}$CH(CH$_3$)OH
CH$_3$(CH$_2$)$_{16}$CH(CH$_3$)OH
C$_{18}$H$_{33}$OH

Esters

C$_{11}$H$_{23}$COOCH$_3$
C$_{11}$H$_{23}$COOC$_4$H$_9$
C$_{13}$H$_{27}$COOCH$_3$
C$_{13}$H$_{27}$COOC$_4$H$_9$
C$_{13}$H$_{27}$COOC$_{12}$H$_{25}$
C$_{15}$H$_{31}$COOC$_2$H$_5$
C$_{15}$H$_{31}$COOC$_4$H$_9$
C$_{17}$H$_{35}$COOC$_4$H$_9$
C$_{17}$H$_{35}$COOC$_8$H$_{17}$
C$_{18}$H$_{37}$COOC$_{12}$H$_{25}$

C$_{11}$H$_{23}$COOC$_2$H$_5$
C$_{11}$H$_{23}$COOC$_{12}$H$_{25}$
C$_{13}$H$_{27}$COOC$_2$H$_5$
C$_{13}$H$_{27}$COOC$_5$H$_{11}$
C$_{13}$H$_{27}$COOC$_{14}$H$_{29}$
C$_{15}$H$_{31}$COOC$_3$H$_7$
C$_{15}$H$_{31}$COOC$_8$H$_{17}$
C$_{17}$H$_{35}$COOC$_5$H$_{11}$
C$_{18}$H$_{37}$COOC$_{10}$H$_{21}$

-continued
CH$_3$(CH$_2$)$_7$CH=CH(CH$_2$)$_7$COO(CH$_2$)$_8$CH=CH(CH$_2$)$_9$CH$_3$
CH$_3$(CH$_2$)$_7$CH=CH(CH$_2$)$_7$COO(CH$_2$)$_9$CH$_3$
CH$_3$(CH$_2$)$_7$CH(CH$_2$)$_7$COOCH$_2$CH(CH$_3$)OCO(CH$_2$)$_7$CH=CH(CH$_2$)$_7$CH$_3$,
etc.

Fluorinated compounds

Preferred fluorinated compounds are perfluoro derivatives.

Examples include perfluorocarboxylic acids, perfluoroalcohols, perfluorocarboxylates, fatty acid esters of perfluoroalcohols, perfluorocarboxylic acid esters of perfluoroalcohols, carboxylates having a perfluoroalkyl group, quaternary ammonium salts having a perfluoroalkyl group, betaines having a perfluoroalkyl group, perfluoro derivatives of ethylene alkylene oxide or adducts thereof, and oligomers having a perfluoroalkylene moiety. Especially preferred among these are
C$_4$F$_9$COOH,
C$_6$F$_{13}$COOH,
C$_7$F$_{15}$COOH,
C$_8$F$_{17}$COOH,
C$_8$F$_{17}$CH$_2$OCH$_2$COOH,
C$_8$F$_{17}$(CH$_2$)$_2$O(CH$_2$)$_2$COOH, etc.

The compound of the above-defined formula and the compound having a boiling point of up to 50° C. are blended in a ratio of from 8:2 to 2:8.

A mixture of two or more compounds of the above-defined formula and a mixture of two or more compounds having a boiling point of up to 50° C. may be contained.

The method of forming the lubricating film is not critical, and coating methods and Langmuir-Blodgett methods may be used. The coating methods include dipping and spin coating.

The lubricating film preferably has a contact angle with water of at least 70°, more preferably at least 90°. The lubricating film having such a contact angle is effective in preventing the magnetic head from clinging to the magnetic recording medium.

The thickness of the lubricating film is usually in the range of about 4 to about 100 Å although it varies with a particular film forming method and a particular compound.

Durability is improved at 4 Å or thicker whereas thinner than 100 Å is effective in minimizing clinging and crash of the magnetic head. The preferred thickness is in the range of 4 to 80 Å, especially 4 to 50 Å.

The magnetic recording medium of the present invention may perform effective recording/reproducing operation in combination with any well-known flying magnetic heads of the composite and monolithic types. Better results are obtained when the medium is operated with flying magnetic heads of the thin film type.

Figure 4:
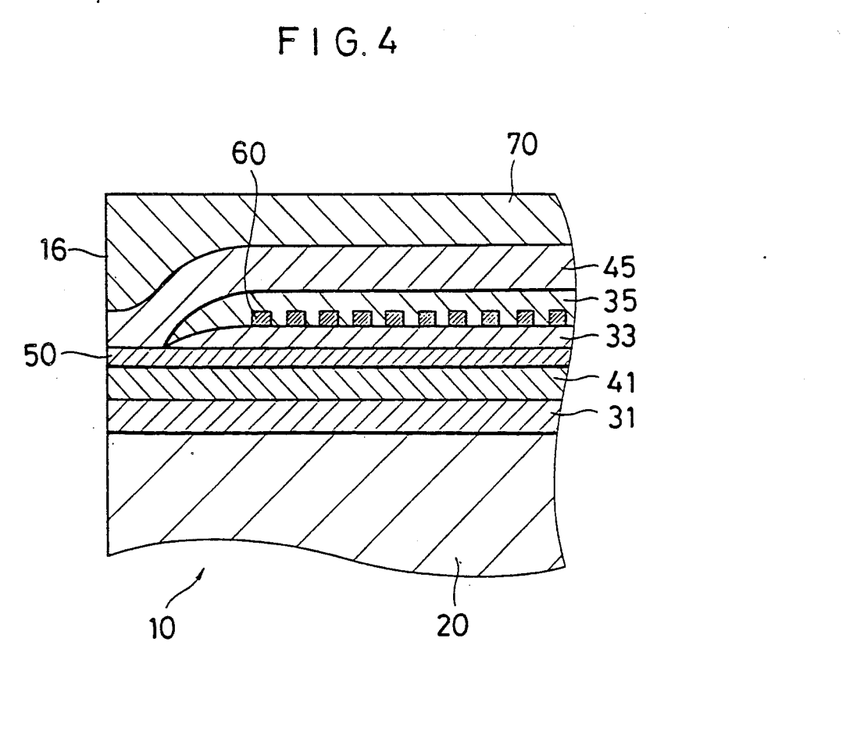
FIG. 4 is a cross section of a portion of a magnetic head used in the method of the present invention.

FIG. 4 is a cross section of a portion of a flying magnetic head of the thin film type for use in a preferred embodiment of the present invention.

The flying magnetic head 10 shown in FIG. 4 includes a base 20, a first insulating layer 31, a lower pole layer 41, a gap layer 50, a second insulating layer 33, a coil layer 60, a third insulating layer 35, and an upper pole layer 45, and a protective layer 70 stacked in this order.

A lubricating film as previously described may be applied to at least the front face or floating surface of the flying magnetic head 10 if desired.

The head on the front face preferably has an Rmax of up to 200 Å, especially 50 to 150 Å. Better performance is expectable when a magnetic recording medium having the above-defined Rmax is operated with a head having such an Rmax.

The coil layer 60 may be formed from any desired material, typically a commonly used metal such as Al and Cu.

No particular limits are imposed on the pattern and density of the coil so that the coil may be wound in a well-known conventional manner. For example, the coil pattern may be of the spiral type illustrated in FIG. 4, laminate type or zigzag type.

The coil layer 60 may be formed by any desired vapor phase deposition techniques such as sputtering.

The base 20 may be formed from any well-known materials including Mn-Zn ferrite.

The base 20 is preferably formed from ceramic materials having a Vickers hardness of at least about 1,000 kgf/mm$^2$, more preferably about 1,000 to about 3,000 kgf/mm$^2$, particularly when the magnetic head is used in combination with the magnetic recording medium of the invention. The benefits of the invention becomes prominent with this combination.

Examples of ceramic materials having a Vickers hardness of at least about 1,000 kgf/mm$^2$ include Al$_2$O$_3$-TiC base ceramic materials, ZrO$_2$ base ceramic materials, SiC base ceramic materials, and AlN base ceramic materials. They may contain an additional component(s) such as Mg, Y, ZrO$_2$, and TiO$_2$.

Preferred among them are Al$_2$O$_3$-TiC base ceramic materials, SiC base ceramic materials, and AlN base ceramic materials. The Al$_2$O$_3$-TiC base ceramic materials are most preferred for their hardness relative to the hardness of magnetic thin films of iron oxide.

The lower and upper pole layers 41 and 45 may be formed from any well-known materials including Permalloy, Sendust, and amorphous magnetic cobalt base alloys.

The magnetic poles are usually provided separately as shown by the lower and upper pole layers 41 and 45 in FIG. 4, with the gap layer or spacer 50 intervening between the lower and upper pole layers 41 and 45.

The gap layer 50 may be formed from any well-known materials including Al$_2$O$_3$ and SiO$_2$.

The magnetic pole layers 41, 45 and the gap layer 50 may be of conventional well-known design with respect to their pattern, thickness and the like.

In the illustrated embodiment, the coil layer 60 is spirally disposed between the lower and upper pole layers 41 and 45 while the insulating layers 33 and 35 intervene between the coil layer 60 and the lower and upper pole layers 41 and 45.

The insulating layer 31 is disposed between the base 20 and the lower pole layer 41.

These insulating layers may be formed from any well-known materials. For example SiO$_2$, glass, and Al$_2$O$_3$ may be used when it is desired to form an insulating thin film by sputtering.

The protective layer 70 is present on the upper pole layer 45. The protective layer may be formed from any well-known materials, for example, Al$_2$O$_3$. An additional resinous coating may be applied to the protective layer.

Briefly stated, the process for producing such a thin film type flying magnetic head includes thin film formation and patterning.

To form thin films which constitute the respective layers as described above, any well known vapor phase deposition and wet deposition techniques may be used, for example, vacuum deposition, sputtering, and plating.

Patterning of the respective layers of the head may be carried out by selective etching or selective deposition, which are both well known in the art. The etching may be either wet or dry etching.

The flying magnetic head as far described is usually combined with well-known members such as an arm to form a head assembly.

Recording and reproducing operation on the magnetic recording medium of the present invention, particularly in the form of a magnetic disk, may be carried out by rotating the disk while keeping the head afloat.

The disk is rotated at about 2,000 to about 6,000 r.p.m.

The distance or spacing of the flying head away from the disk surface is set to at most 0.2 $\mu$m, preferably at most 0.15 $\mu$m, more preferably at most 0.1 $\mu$m. A typical spacing in the range of from 0.01 to 0.09 $\mu$m is effective for flying performance and CSS durability.

The flying distance may be adjusted by changing the slider width and head load.

CSS durability is further enhanced when the magnetic head on the front face is provided with a lubricating film as defined above.

Excellent CSS durability is observed when a magnetic head having such a lubricating film is combined with the magnetic recording medium having a magnetic layer as defined in the present invention.

EXAMPLE

Examples of the present invention are given below by way of illustration.

EXAMPLE 1

Preparation of Magnetic Disk Samples

A substrate of aluminosilicate glass having an outer diameter of 130 mm, an inner diameter of 40 mm and a thickness of 1.9 mm was polished and then chemically tempered. Chemical tempering was conducted by dipping in molten potassium nitrate at 450° C. for 10 hours.

The glass substrate was further smoothed on the surface by mechanochemical polishing with abrasive liquid containing colloidal silica.

By varying the polishing conditions, there were obtained a series of glass substrates having varying Rmax. The Rmax of glass substrates used in magnetic disk samples are reported in Table 1.

After each glass substrate was cleaned, a magnetic thin film was formed on the surface of the substrate as follows.

First, preliminary sputtering was carried out in an argon gas atmosphere to remove an oxide film from the surface of an iron target. Reactive sputtering was then carried out by introducing $O_2$ gas into the atmosphere so as to blow against the substrate, depositing an $Fe_3O_4$ film.

The $P_{(Ar+O2)}$ and $P_{O2}/P_{(Ar+O2)}$ during formation of $Fe_3O_4$ films on magnetic disk samples are shown in Table 1.

The $Fe_3O_4$ films were then oxidized by heating at a temperature of 200° to 400° C. for 1 to 5 hours in air, converting into $\gamma$-$Fe_2O_3$ magnetic layers having varying Rmax. The magnetic layer was 1,500 Å thick.

The Rmax of the disk samples on the magnetic layer side are reported in Table 1.

Rmax was measured by a probe type surface roughness meter.

The magnetic layer of each disk sample was analyzed for X-ray diffraction to draw an X-ray diffraction chart. An arrangement as shown in FIG. 3 was used for X-ray diffraction.

The analytical results of an X-ray diffraction chart of each sample are reported in Table 1. X-ray diffraction charts of sample Nos. 1, 2, 7 and 8 are shown in FIGS. 6, 7, 8, and 9.

Figure 10:
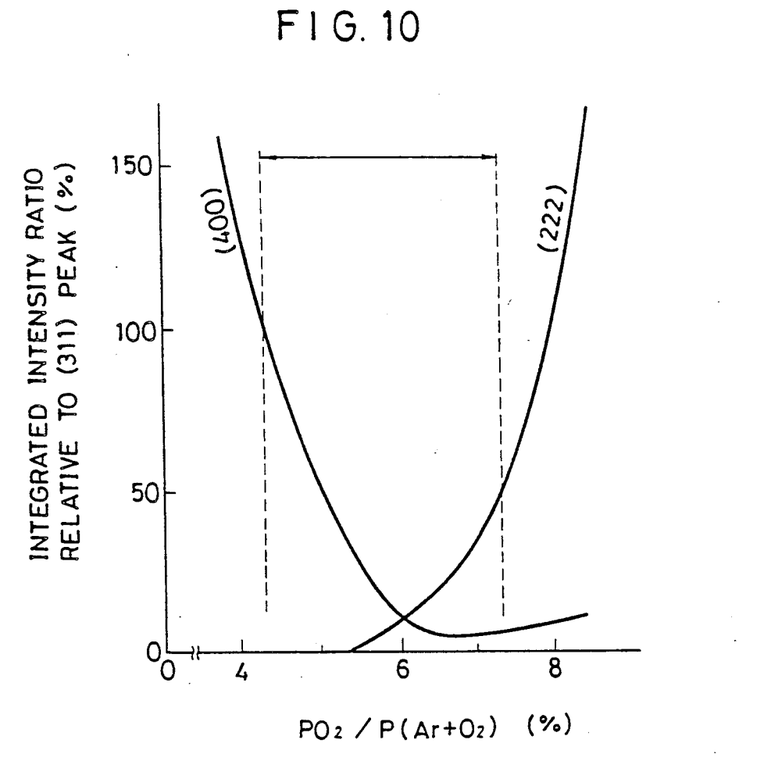
FIG. 10 is a diagram showing changes of P(400)/P(311) and P(222)/P(311) of the magnetic layer with varying $P_{O2}/P_{(Ar+O2)}$.

FIG. 10 shows how P(400)/P(311) and P(222)/P(311) of the magnetic layer vary with $P_{O2}/P_{(Ar+O2)}$.

A lubricating film was then formed on the magnetic layer of each sample to a thickness of 20 Å from a Fron solution of 0.1 wt % Compound No. 1 identified below by dipping.

Compound No. 1

$F(CF_2CF_2CF_2O)_nCF_2CF_3$

DEMNUM S-20 manufactureed by Daikin Industry K.K.
Average molecular weight 2,700
Dynamic viscosity 53±10 cSt at 20° C.
Pour point −75° C.
Density 1.86 g/ml at 20° C.

The magnetic disk samples were subjected to a contact. start-and-stop (CSS) durability test. The results are shown in Table 1.

CSS durability test (a) Magnetic head

Magnetic Head No. 1

A flying magnetic head of the air bearing type was prepared by forming thin film elements on a $Al_2O_3$-TiC base having a Vickers hardness of 2200 kgf/mm², processing to the desired head configuration, and mounting the head to a spring support known as a gimbal. The head had an Rmax of 130 Å on the floating surface.

Magnetic Head No. 2

A flying magnetic head was prepared by the same procedure as Head No. 1 except that a SiC base having a Vickers hardness of 3000 kgf/mm² was used.

Figure 11:
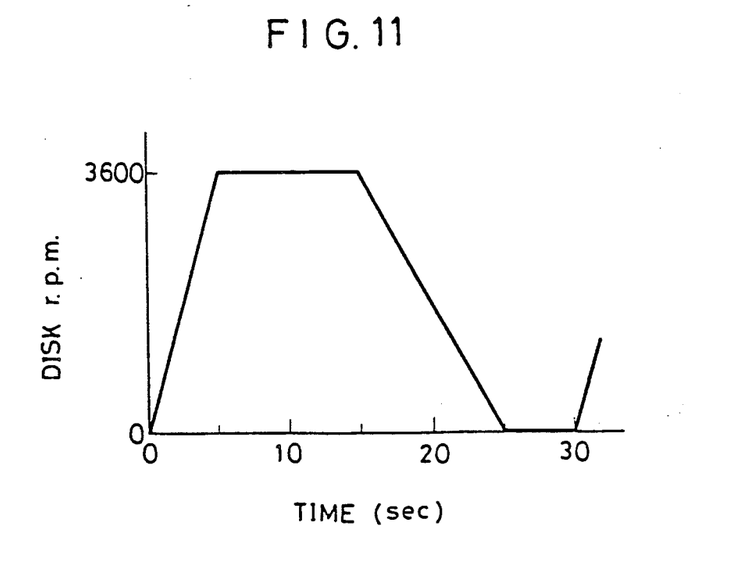
FIG. 11 is a diagram showing the profile of one cycle of a CSS test.

Each head was designed to provide a flying height of 0.1 $\mu$m by adjusting the slider width and gimbal load.
(b) CSS A CSS test was carried out on the disk using the aforementioned heads at 25° C. and RH 50%. The CSS test repeated the cycle shown in FIG. 11. The CSS cycle was repeated until the recording/reproducing output was reduced to below one half of the initial. The CSS durability was evaluated in terms of the following five ratings.
⊚:100,000 cycles or more
○:50,000–100,000 cycles
△:20,000–50,000 cycles X:10,000–20,000 cycles
XX:less than 10,000 cycles Dynamic viscosity 250±25 cSt at 20° C.
Pour point 35° C.

TABLE 1

| Sample No. | Glass substrate surface Rmax (Å) | Fe₃O₄ Film Formation | | Heat Treatment | | Disk surface Rmax (Å) | P(400)/ P(311) | P(222)/ P(311) | CSS Durability | |
|---|---|---|---|---|---|---|---|---|---|---|
| | | P(Ar + O₂) (Torr) | PO₂/ P(Ar + O₂) (%) | Temp. (°C.) | Time (hr) | | | | Head No. 1 | Head No. 2 |
| 1 | 50 | $1 \times 10^{-3}$ | 5.2 | 310 | 1 | 100 | 0.42 | 0 | ⊚ | ⊚ |
| 2 | 45 | $1 \times 10^{-3}$ | 6.6 | 315 | 1.5 | 110 | 0.06 | 0.21 | ⊚ | ⊚ |
| 3 | 30 | $1 \times 10^{-3}$ | 5.6 | 300 | 1.5 | 70 | 0.23 | 0.04 | ○ | ○ |
| 4* | 5 | $1 \times 10^{-3}$ | 6.5 | 290 | 3 | 40 | 0.06 | 0.20 | x | x x |
| 5 | 50 | $1 \times 10^{-3}$ | 4.6 | 310 | 1 | 100 | 0.77 | 0 | ⊚ | ○ |
| 6 | 50 | $1 \times 10^{-3}$ | 7.1 | 310 | 1 | 100 | 0.06 | 0.40 | ⊚ | ○ |
| 7* | 50 | $1 \times 10^{-3}$ | 4.2 | 310 | 1 | 100 | 1.10 | 0 | ⊚ | x x |
| 8* | 50 | $1 \times 10^{-3}$ | 8.1 | 310 | 1 | 100 | 0.10 | 1.14 | ⊚ | x x |
| 9 | 70 | $1 \times 10^{-3}$ | 6.0 | 310 | 2 | 130 | 0.12 | 0.10 | ⊚ | ○ |
| 10* | 120 | $1 \times 10^{-3}$ | 5.3 | 315 | 5 | 250 | 0.36 | 0 | x x | x x |

*Comparison

The data of Table 1 demonstrate the effectiveness of the invention.

Those magnetic disk samples whose Rmax on the substrate surface and Rmax on the magnetic layer side fall within the ranges defined in the present invention show excellent CSS durability. Those magnetic disk samples whose P(400)/P(311) and P(222)/P(311) fall within the ranges defined in the present invention show superior CSS durability even when operated with a magnetic head having a higher base hardness.

EXAMPLE 2

Magnetic recording disk samples were prepared by changing the compound contained in the lubricating film. Except the lubricating film, the samples were the same as sample No. 2 prepared in Example 1.

The samples were measured for coefficient of friction both at the initial and after the durability test.

The compounds used in the lubricating films were Compound No. 1 identified above and Compound No. 2 identified below. The ratio of contents of the compounds in the lubricating film of each sample is shown in Table 2.

Compound No. 2

$C_8F_{17}COOH$

The coating solutions were 0.1% by weight solutions in Fron and the film thickness was 20 Å.

Comparative lubricating films were 20 Å monolayer films of the following compounds.

Compound A $CF_3-[(O-CF_2-CF_2)_m-(O-CF_2)_n-]O-CF_3$

Fomblin Z-03 manufactured by Montefluos S.A.
Average molecular weight 5,000
Dynamic viscosity 30±6 cSt at 20° C.
Pour point −72° C.
Density 1.83 g/ml at 20° C.

Compound B

Fomblin Y-25 manufactured by Montefluos S.A.
Average molecular weight 3,000
Density 1.90 g/ml at 20° C.

Compound C

Krytox 143AZ manufactured by E. I. duPont
Average molecular weight 1,300
Dynamic viscosity 77 cSt at 20° C.

Initial coefficient of friction

Using Magnetic Head No. 1, a coefficient of dynamic friction was measured at 1 rpm for one minute.

The results are shown in Table 2. The initial coefficients of friction reported in Table 2 are minimum and maximum values during measurement.

Coefficient of friction after heavy duty drive

A sample was driven for one hour at 100 rpm in continuous contact with Magnetic Head No. 1 before a coefficient of dynamic friction was measured at 1 rpm for one minute.

The results are shown in Table 2. The coefficients of friction reported in Table 2 are minimum and maximum values during measurement.

TABLE 2

| Sample No. | Ratio of compound No. 1 to No. 2 in lubricating film | | Coefficient of friction | |
|---|---|---|---|---|
| | | | Initial | After heavy duty drive |
| 11* | 0 | 100 | 0.20 | stick slip 10 minutes |
| 12 | 20 | 80 | 0.30–0.33 | 0.65–0.68 |
| 13 | 40 | 60 | 0.38–0.44 | 0.50–0.54 |
| 14 | 50 | 50 | 0.40–0.43 | 0.43–0.46 |
| 15 | 60 | 40 | 0.42–0.47 | 0.45–0.50 |
| 16 | 80 | 20 | 0.48–0.55 | 0.53–0.60 |
| 17 | 100 | 0 | 0.50–0.60 | 0.53–0.63 |
| 18* | Compound A | (100) | 0.60–0.70 | stick slip 30 minutes |
| 19* | Compound B | (100) | 0.65–0.75 | stick slip 10 minutes |
| 20* | Compound C | (100) | 0.65–0.75 | stick slip 10 minutes |

*Comparison

The data of Table 2 demonstrate the effectiveness of the invention.

The samples having lubricating films containing the compound of the formula defined above (Compound No. 1) show a low coefficient of friction even after the heavy duty drive. The initial coefficient of friction is reduced by adding a compound having a melting point of up to 50° C. (Compound No. 2) to the compound of the formula defined above.

The coefficient of friction after the heavy duty drive is further reduced in this case and friction variations are restrained.

Such benefits become more prominent when the ratio of the contents of the two compounds is from 2:8 to 8:2.

The sample containing only Compound No. 2 and samples containing Compounds A to C which are analogous to the present compound, but have a different backbone structure have a low initial coefficient of friction, but are impractical since sticky slip occurs during the heavy duty drive.

The samples shown in Table 2 were also subjected to the CSS durability test, obtaining equivalent results to the heavy duty drive test.

The same samples as shown in Table 2 except that Compound No. 2 was replaced by the following compounds were measured and tested as previously described, obtaining equivalent results to the samples of Table 2.

$C_6F_{13}COOH$
$C_7F_{15}COOH$

EXAMPLE 3

Preparation of Magnetic Disk Samples

Magnetic disk samples were prepared as in Example 1 except that the glass substrates used had Rmax shown in Table 3.

During formation of a $Fe_3O_4$ film on each magnetic disk sample, $P_{(Ar+O2)}$ was $1 \times 10^{-3}$ Torr and $P_{O2}/P_{(Ar+O2)}$ was 0.058.

The $Fe_3O_4$ film was oxidized into a $\gamma$-$Fe_2O_3$ magnetic layer by a heat treatment in air under the conditions reported in Table 3. The magnetic layer was 2,000 Å thick.

The Rmax of the disk samples on the magnetic layer side are reported in Table 3.

The magnetic layer of each disk sample was analyzed for X-ray diffraction to draw an X-ray diffraction chart as in Example 1.

The analytical results of an X-ray diffraction chart of each sample are reported in Table 3.

Figure 12:
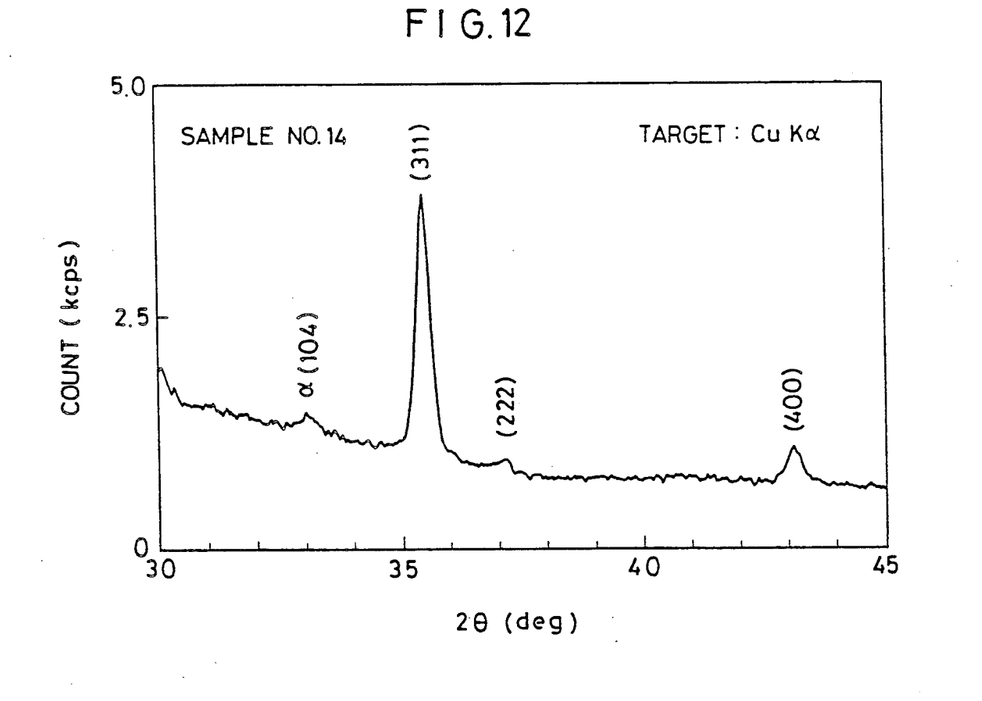
FIG. 12 is an X-ray diffraction chart of a $\gamma\text{-}Fe_2O_3$ magnetic layer.

The X-ray diffraction chart of sample No. 104 is shown in FIG. 12.

As seen from FIG. 12, a peak corresponding to an index of plane (104) of $\alpha$-$Fe_2O_3$ is observed in the chart.

The magnetic layer of this sample was further analyzed for X-ray diffraction by means of a low incident angle X-ray diffractometer as shown in FIG. 3 with angle settings of $\beta=0.5°$ and $\beta=2.0°$.

Figure 13:
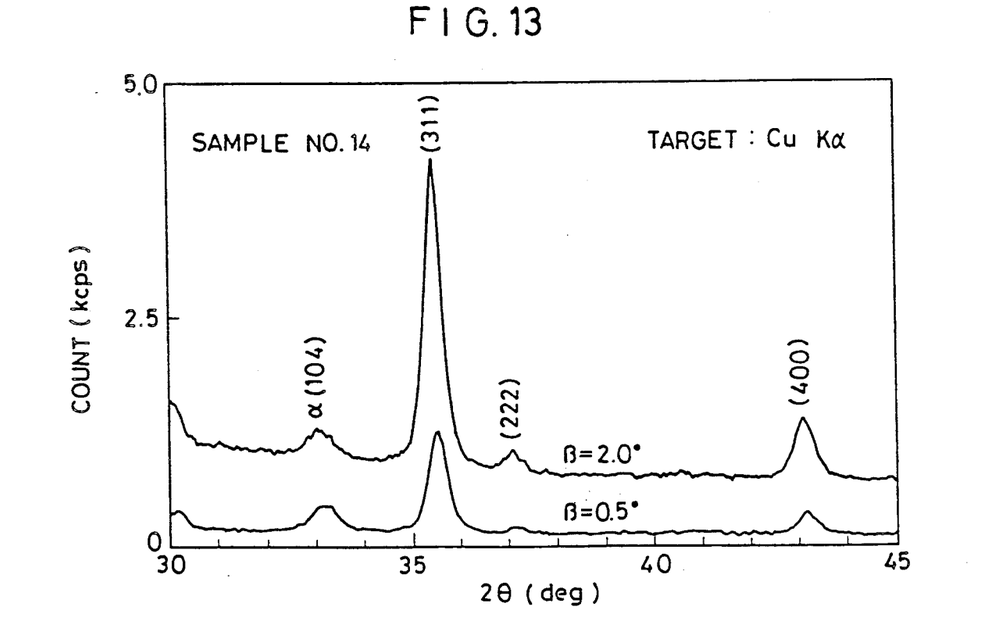
FIG. 13 is an X-ray diffraction chart of a $\gamma\text{-}Fe_2O_3$ magnetic layer as measured by a low incident angle X-ray diffractometer.

The X-ray diffraction charts are shown in FIG. 13.

As seen from FIG. 13, the value of P(104)/P(311) at $\beta=0.5°$ is approximately 3 times the value of P(104)/P(311) at $\beta=2.0°$, indicating that more $\alpha$-$Fe_2O_3$ was present on the surface side of the magnetic layer.

Substantially equivalent results were obtained when the remaining samples of Table 3 were similarly analyzed.

A lubricating film as in Example 1 was then formed on the magnetic layer of each sample.

The magnetic disk samples were measured for sliding durability and reproduced output as follows. The results are shown in Table 3.

Sliding durability (a) Magnetic head.

A flying magnetic head of the air bearing type was prepared by forming thin film elements on a $Al_2O_3$-TiC base having a Vickers hardness of 2200 kgf/mm², processing to the desired head configuration, and mounting the head to a spring support known as a gimbal.

The head had an Rmax of 130 Å on the floating surface.

A slider width of 150 μm and a gimbal load of 25 grams were set.

(b) Sliding durability

A sliding durability test was conducted at 25° C. and RH 50% using the magnetic head mentioned above.

The magnetic head was forced in contact with the magnetic disk, which was rotated at a relative speed of 20 m/sec. An acoustic emission (AE) sensor was used to observe that the head was in continuous contact with the disk without floating.

Durability was evaluated according to the following ratings in terms of the time taken until the magnetic disk was damaged.

⊚:60 minutes or longer
◯:40.60 minutes
△:20.40 minutes
X:shorter than 20 minutes It should be noted that this sliding durability test is a more severe durability test than the CSS durability test.

Reproduced output

The samples shown in Table 3 were measured for reproduced output to determine a loss of reproduced output due to inclusion of $\alpha$-$Fe_2O_3$.

Evaluation was made according to the following ratings on a relative basis that the reproduced output of sample No. 101 which was free of $\alpha$-$Fe_2O_3$ was 100.

◯:90 or higher
X:lower than 90

TABLE 3

| Sample No. | Glass substrate surface Rmax (Å) | Heat Treatment | | | P (104) /P (311) | P (400) /P (311) | P (222) /P (311) | Disk surface Rmax (Å) | Reproduced output | Sliding durability |
| --- | --- | --- | --- | --- | --- | --- | --- | --- | --- | --- |
| | | Heating rate (°C./min) | Heating temp. (°C.) | Heating time (hr) | | | | | | |
| 101 | 50 | 2.0 | 310 | 1 | 0 | 0.16 | 0.06 | 100 | ◯ | X |
| 102 | 50 | 3.0 | 310 | 1 | 0.010 | 0.16 | 0.06 | 100 | ◯ | △ |
| 103 | 50 | 5.0 | 310 | 1 | 0.040 | 0.16 | 0.06 | 100 | ◯ | ◯ |
| 104 | 50 | 7.5 | 310 | 1 | 0.075 | 0.16 | 0.06 | 100 | ◯ | ⊚ |
| 105 | 50 | 11.0 | 310 | 1 | 0.120 | 0.16 | 0.06 | 100 | ◯ | ⊚ |
| 106 | 50 | 17.0 | 310 | 1 | 0.180 | 0.16 | 0.06 | 100 | ◯ | ◯ |

TABLE 3-continued

| Sample No. | Glass substrate surface Rmax (Å) | Heat Treatment Heating rate (°C./min) | Heating temp. (°C.) | Heating time (hr) | P (104) /P (311) | P (400) /P (311) | P (222) /P (311) | Disk surface Rmax (Å) | Reproduced output | Sliding durability |
|---|---|---|---|---|---|---|---|---|---|---|
| 107 | 50 | 30.0 | 310 | 1 | 0.250 | 0.16 | 0.06 | 100 | x | Δ |

The data of Table 3 demonstrate the effectiveness of the invention.

All the samples were subjected to a CSS durability test to find a similar tendency to the sliding durability test.

The samples of Table 3 were measured for coefficient of friction both at the initial and after the heavy duty drive as in Example 2, finding equivalent results to Example 2 in accordance with the compounds contained in the lubricating films.

The magnetic heads used in Examples 1 to 3 were provided on the front face with lubricating films as mentioned above and operated in combination with the magnetic disk samples prepared in Examples 1 to 3 to carry out similar measurements.

It was found that better results than in the foregoing examples were obtained when the heads were combined with the magnetic disks having a lubricating film. A similar tendency was observed when combined with magnetic disks free of a lubricating film.

The foregoing data demonstrate the effectiveness of the invention.

BENEFITS OF THE INVENTION

There have been described a magnetic recording medium featuring excellent durability, especially CSS durability and a reliable magnetic recording/reproducing method.

We claim:

1. A magnetic recording medium comprising a rigid substrate having a pair of opposed major surfaces and a layer of continuous magnetic thin film on at least one major surface predominantly comprising $\gamma\text{-}Fe_2O_3$, characterized in that said magnetic layer meets the following conditions:

$$0 \leq P(400)/P(311) \leq 1.0 \text{ and}$$

$$0 \leq P(222)/P(311) \leq 0.5$$

wherein P(400), P(222) and P(311) are peak areas at indexes of plane (400), (222) and (311) of $\gamma\text{-}Fe_2O_3$, respectively, in an X-ray diffraction chart of the magnetic layer, and said substrate has a surface roughness Rmax in the range of from 10 to 100 Å on the one major surface and said medium has a surface roughness Rmax in the range of from 50 to 200 Å on an outer surface adjacent to the magnetic layer, and said medium further comprises on said magnetic layer a lubricating film containing a compound of the following formula:

$$F(CF_2CF_2CF_2O)_n CF_2CF_3$$

wherein n is a positive integer, with an average molecular weight of 1,000 to 10,000, and said substrate is formed of glass.

2. The magnetic recording medium of claim 1 wherein said lubricating film has a thickness of 4 to 100 Å.

3. The magnetic recording medium of claim 1 wherein said lubricating film further contains a compound having a melting point of up to 50° C.

4. The magnetic recording medium of claim 3 wherein said compound having a melting point of up to 50° C. is at least one member selected from the group consisting of fatty acids and salts thereof, alcohols, esters, and fluorinated compounds.

5. The magnetic recording medium of claim 1 wherein said magnetic layer further contains $\alpha\text{-}Fe_2O_3$.

6. The magnetic recording medium of claim 5 wherein in said magnetic layer the content of $\alpha\text{-}Fe_2O_3$ is higher on a side remote from said substrate than on a side adjacent to said substrate.

7. The magnetic recording medium of claim 5 wherein said magnetic layer further meets the following condition:

$$0.02 \leq P(104)/P(311) \leq 0.20$$

wherein P(104) is a peak area at an index of plane (104) of $\alpha\text{-}Fe_2O_3$ in an X-ray diffraction chart of the magnetic layer.

8. A method for recording and reproducing information in a magnetic recording medium wherein said magnetic recording medium is a disk, comprising the step of rotating the magnetic recording medium in close proximity to a flying magnetic head, characterized in that the flying magnetic head is kept at a spacing of up to 0.2 μm from the rotating magnetic medium, said magnetic recording medium comprising a rigid substrate having a pair of opposed major surfaces and a layer of continuous magnetic thin film on at least one major surface predominantly comprising $\gamma\text{-}Fe_2O_3$, said magnetic layer meets the following conditions:

$$0 \leq P(400)/P(311) \leq 1.0 \text{ and}$$

$$0 \leq P(222)/P(311) \leq 0.5$$

wherein P(400), P(222) and P(311) are peak areas at indexes of plane (400), (222) and (311) of $\gamma\text{-}Fe_2O_3$, respectively, in an X-ray diffraction chart of the magnetic layer, and said substrate has a surface roughness Rmax in the range of from 10 to 100 Å on the one major surface and said medium has a surface roughness Rmax in the range of from 50 to 200 Å on an outer surface adjacent to the magnetic layer, and a lubricating film containing a compound of the following formula:

$$F(CF_2CF_2CF_2O)_n CF_2CF_3$$

wherein n is a positive integer, with an average molecular weight of 1,000 to 10,000 is present on said magnetic layer and/or the front face of said magnetic head, and said substrate is formed of glass.

9. The magnetic recording/reproducing method of claim 8 wherein said lubricating film has a thickness of 4 to 100 Å.

10. The magnetic recording/reproducing method of claim 8 wherein said lubricating film further contains a compound having a melting point of up to 50° C.

11. The magnetic recording/reproducing method of claim 10 wherein said compound having a melting point of up to 50° C. is at least one member selected from the group consisting of fatty acids and slats thereof, alcohols, esters, and fluorinated compounds.

12. The magnetic recording/reproducing method of claim 8 wherein said magnetic layer further contains $\alpha\text{-}Fe_2O_3$.

13. The magnetic recording/reproducing method of claim 12 wherein in said magnetic layer the content of $\alpha\text{-}Fe_2O_3$ is higher on a side remote from said substrate than on a side adjacent to said substrate.

14. The magnetic recording/reproducing method of claim 12 wherein said magnetic layer further meets the following condition:

$$0.02 \leq P(104)/P(311) \leq 0.20$$

wherein P(104) is a peak area at an index of plane (104) of $\alpha\text{-}Fe_2O_3$ in an X-ray diffraction chart of the magnetic layer.

15. The magnetic recording/reproducing method o claim 8 wherein the flying magnetic head is kept at a spacing of up to 0.1 μm.

* * * * *